United States Patent
Roegiers et al.

(10) Patent No.: US 9,650,465 B2
(45) Date of Patent: *May 16, 2017

(54) HETEROPHASIC PROPYLENE COPOLYMER WITH IMPROVED CREEP BEHAVIOR

(75) Inventors: Kristien Roegiers, Wolvertem (BE); Geert Snellings, Sint-Lievens-Houtem (BE); Alain Standaert, Brussels (BE)

(73) Assignee: Total Research & Technology Feluy, Seneffe, Feluy (BE)

( * ) Notice: Subject to any disclaimer, the term of this patent is extended or adjusted under 35 U.S.C. 154(b) by 774 days.

This patent is subject to a terminal disclaimer.

(21) Appl. No.: 12/811,846

(22) PCT Filed: Dec. 18, 2008

(86) PCT No.: PCT/EP2008/067869
§ 371 (c)(1),
(2), (4) Date: Oct. 28, 2010

(87) PCT Pub. No.: WO2009/087039
PCT Pub. Date: Jul. 16, 2009

(65) Prior Publication Data
US 2011/0124798 A1 May 26, 2011

(30) Foreign Application Priority Data
Jan. 7, 2008 (EP) .................. 08150072

(51) Int. Cl.
| C08L 23/00 | (2006.01) |
| C08F 297/08 | (2006.01) |
| C08F 10/06 | (2006.01) |
| C08L 23/12 | (2006.01) |
| C08F 110/06 | (2006.01) |
| C08L 23/16 | (2006.01) |

(52) U.S. Cl.
CPC ........... *C08F 297/08* (2013.01); *C08F 10/06* (2013.01); *C08L 23/12* (2013.01); *C08F 110/06* (2013.01); *C08L 23/16* (2013.01); *C08L 2207/02* (2013.01)

(58) Field of Classification Search
CPC ......... C08L 23/12; C08F 297/08; C08F 10/06
USPC ........................................................ 525/240
See application file for complete search history.

(56) References Cited

U.S. PATENT DOCUMENTS

| 5,519,090 A * | 5/1996 | Schwager et al. ............ 525/240 |
| 6,221,974 B1 * | 4/2001 | Harkonen ............... F16L 57/02 502/132 |
| 6,437,063 B1 * | 8/2002 | Karbasi et al. ............... 526/128 |
| 6,441,094 B1 * | 8/2002 | Cecchin et al. .............. 525/191 |
| 6,586,531 B2 * | 7/2003 | Washiyama et al. ......... 525/240 |
| 7,482,406 B2 * | 1/2009 | News et al. .................. 525/240 |
| 7,572,860 B2 * | 8/2009 | De Palo et al. .............. 525/191 |
| 8,008,400 B2 * | 8/2011 | Pelliconi et al. ............. 525/191 |
| 8,227,550 B2 * | 7/2012 | Masarati et al. ............. 525/240 |
| 8,722,808 B2 * | 5/2014 | Pellegatti et al. ............ 525/322 |
| 2006/0194924 A1 * | 8/2006 | Pelliconi ....................... 525/240 |
| 2007/0203298 A1 * | 8/2007 | Massari et al. ............... 525/191 |
| 2011/0104447 A1 * | 5/2011 | Ydens et al. ................. 428/167 |

FOREIGN PATENT DOCUMENTS

| EP | 0152701 A1 | 8/1985 |
| EP | 0361493 A1 | 4/1990 |
| EP | 0368577 A2 | 5/1990 |
| EP | 0728769 A1 | 8/1996 |
| EP | 1857476 A1 | 11/2007 |
| WO | 0136502 A1 | 5/2001 |
| WO | 03102069 A1 | 12/2003 |
| WO | 2007147864 A2 | 12/2007 |
| WO | 2007147865 A2 | 12/2007 |
| WO | WO 2007147864 | * 12/2007 |

OTHER PUBLICATIONS

Extended European Search Report issued in EP08150072.0, dated Jun. 9, 2008 (4 pages).
International Search Report issued in PCT/EP2008/067869, dated Jun. 4, 2009 (11 pages).
Office Action issued in Eurasion Patent Application No. 201000767 and English translation thereof, dated Oct. 28, 2011 (4 pages).
English translation of Office Action issued in Korean Patent Application No. 2010-7014551, dated Jan. 30, 2012 (3 pages).
Blomenhofer et al., Designer Nucleating Agents for Polypropylene, Macromolecules 2005, 38, 3688-3695.
G. J. Ray et al. "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, 1977, p. 773-778.
Plastics Additives Handbook, ed. H. Zweifel, 5th edition, 2001, Hanser Publishers.

* cited by examiner

*Primary Examiner* — Irina Krylova
(74) *Attorney, Agent, or Firm* — Albert Shung

(57) ABSTRACT

The present invention concerns heterophasic propylene copolymers, comprising a propylene homopolymer (PPH) and an ethylene-propylene rubber (EPR), having a very broad molecular weight distribution, a well-defined total ethylene content and a specific intrinsic viscosities of the ethylene-propylene rubber (EPR). The invention further concerns the process to produce such heterophasic propylene copolymers. The heterophasic propylene copolymers of the present invention are particularly suited for pails, pallets, IBCs and crates. In particular, the heterophasic propylene copolymers of the present invention are characterized by an improved resistance to creep.

25 Claims, No Drawings

HETEROPHASIC PROPYLENE COPOLYMER WITH IMPROVED CREEP BEHAVIOR

CROSS-REFERENCE TO RELATED APPLICATIONS

This application claims the benefit of PCT/EP2008/067869, filed Dec. 18, 2008, which claims priority from EP 08150072.0, filed Jan. 7, 2008.

FIELD OF THE INVENTION

The present invention concerns heterophasic propylene copolymers, comprising a propylene homopolymer (PPH) and an ethylene-propylene rubber (EPR), having a very broad molecular weight distribution, a well-defined total ethylene content and a specific intrinsic viscosity of the ethylene-propylene rubber (EPR). The invention further concerns a process to produce such heterophasic propylene copolymers. The heterophasic propylene copolymers of the present invention are particularly suited for pails and crates. In particular, the heterophasic propylene copolymers of the present invention are characterized by an improved resistance to creep.

THE TECHNICAL PROBLEM AND THE PRIOR ART

Polypropylene has become the material of choice for many applications because of the good combination of mechanical properties, chemical resistance, processing behavior and economics. Polypropylene also offers the possibility to vary the mechanical properties in a wide range, for example by blending with other polymers. One particular such example is the improvement of impact properties, in particular at low temperatures, by the blending of a propylene homopolymer with a rubber. Such a blend results in products that are best described as heterophasic propylene copolymers. Often they are also referred to as "impact copolymers" or just "propylene block copolymers". Typical commercially available heterophasic propylene copolymers comprise a propylene homopolymer and an ethylene propylene rubber (EPR).

Heterophasic propylene copolymers can be produced for example by compounding a rubber into a propylene polymer. In this case the propylene polymer is frequently also referred to as the matrix, wherein the rubber is dispersed. However, for large-scale industrial production the preferred production method is by sequential polymerization in a series of polymerization reactors in presence of a polymerization catalyst, an external electron donor and hydrogen for controlling the molecular weight of the polymer produced, wherein in a first step the propylene polymer, which is to serve as the matrix, is produced by homopolymerization of propylene, and in a second step an ethylene-propylene rubber (EPR) is produced by copolymerization of propylene with ethylene.

The presence of a propylene homopolymer and an ethylene propylene rubber (EPR) allows to modify the properties of these products in many ways, for example to improve the rigidity or the impact strength. However, it has generally been found that an increase in rigidity leads to a corresponding decrease in impact strength and vice versa.

Today, heterophasic propylene copolymers are widely used in extrusion and injection molding applications, such as for example the production of sheet, film, pails, containers, crates, intermediate bulk containers (IBCs), pallets etc.

Due to environmental and economic pressures producers constantly work on down gauging and lightweighting such products. In addition, producers are interested in increased processability which allows them to produce at higher production rates.

It is therefore an object of the present invention to provide heterophasic propylene copolymers with improved rigidity.

It is a further object of the present invention to provide heterophasic propylene copolymers with improved impact strength.

In particular, it is an object of the present invention to provide heterophasic propylene copolymers with an improved balance between rigidity and impact strength.

Furthermore, it is an object of the present invention to provide heterophasic propylene copolymers that are suitable for injection molding.

It is a further particular object of the present invention to provide heterophasic propylene copolymers that are suitable for injection molding of pails, crates, IBCs and pallets.

BRIEF DESCRIPTION OF THE INVENTION

We have discovered that at least one of the above objectives can be met by providing a heterophasic propylene copolymer comprising
(i) a propylene homopolymer (PPH), and
(ii) from 12.0 wt % to 18.0 wt % of an ethylene propylene rubber (EPR),
wherein the heterophasic propylene copolymer has a melt flow index in the range from 2.0 dg/min to 6.0 dg/min (measured according to ISO 1133, condition L, 230° C., 2.16 kg), a molecular weight distribution $M_w/M_n$ of 11.0 or more (as measured on pellets) and a total ethylene content in the range from 6.0 wt % to 11.0 wt % relative to the total weight of the heterophasic propylene copolymer, and wherein the ethylene propylene rubber (EPR) has an intrinsic viscosity (measured in tetralin at 135° C.) in the range from 2.0 dl/g to 4.0 dl/g.

The present invention also provides a process for the production of a heterophasic propylene copolymer, said heterophasic propylene copolymer comprising
(i) a propylene homopolymer (PPH), and
(ii) from 12.0 wt % to 18.0 wt % of an ethylene propylene rubber (EPR),
in presence of a Ziegler-Natta polymerization catalyst, an aluminium alkyl, an external electron donor and hydrogen, said process comprising the steps of
(a) polymerizing propylene to produce a propylene homopolymer (PPH),
(b) subsequently transferring the propylene homopolymer obtained in step (a) to a further polymerization reactor, and
(c) copolymerizing propylene and ethylene to produce an ethylene-propylene rubber (EPR) in said further polymerization reactor,
wherein the heterophasic propylene copolymer has a melt flow index (measured according to ISO 1133, condition L, 230° C., 2.16 kg) in the range from 2.0 dg/min to 6.0 dg/min, a molecular weight distribution $M_w/M_n$ of 11.0 or more (measured on pellets) and a total ethylene content in the range from 6.0 wt % to 11.0 wt %, relative to the total weight of the heterophasic propylene copolymer, and wherein the EPR has an intrinsic viscosity (measured in tetralin at 135° C.) in the range from 2.0 dl/g to 4.0 dl/g.

Further, the present invention provides for articles made with such a heterophasic propylene copolymer and the use of such a heterophasic propylene copolymer for the manufacture of articles with improved resistance to creep.

DETAILED DESCRIPTION OF THE INVENTION

We have now discovered that at least one of the above objectives can be met by providing a heterophasic propylene copolymer having a very broad molecular weight distribution, a well-defined total ethylene content and a specific intrinsic viscosity of the ethylene-propylene rubber (EPR).

The heterophasic propylene copolymers of the present invention have a melt flow index in the range from 2.0 dg/min to 6.0 dg/min (measured according to ISO 1133, condition L, 230° C., 2.16 kg). Preferably the melt flow index is in the range from 2.5 dg/min to 5.0 dg/min, more preferably in the range from 3.0 dg/min to 4.5 dg/min and most preferably in the range from 3.0 dg/min to 4.0 dg/min.

Further, the heterophasic propylene copolymers of the present invention are characterized by a very broad molecular weight distribution $M_w/M_n$. The molecular weight distribution $M_w/M_n$ of 11.0 or more, when measured on pellets. Preferably it is 11.5 or more. Most preferably it is 12.0 or more. Molecular weights and molecular weight distribution are determined by Size Exclusion Chromatography (SEC).

The heterophasic propylene copolymers of the present invention are also characterized by a total ethylene content in the range from 6.0 wt % to 11.0 wt %, relative to the total weight of the heterophasic propylene copolymer. Preferably, the total ethylene content is at least 6.5 wt %, more preferably at least 7.0 wt %, even more preferably at least 7.5 wt % and most preferably at least 8.0 wt %. Preferably the total ethylene content is at most 10.5 wt %, more preferably at most 10.0 wt % and most preferably at most 9.5 wt %. The total ethylene content can easily be determined by analytical methods, such as by IR- or NMR-analysis.

The heterophasic propylene copolymers of the present invention comprise a propylene homopolymer (PPH) and an ethylene-propylene rubber (EPR). Preferably, the propylene homopolymer (PPH) and the ethylene-propylene rubber (EPR), when taken together, preferably comprise at least 90.0 wt % of the heterophasic propylene copolymer. More preferably, they comprise at least 95.0 wt % or 97.0 wt % or 99.0 wt %, even more preferably at least 99.5 wt % and most preferably at least 99.8 wt % of the heterophasic propylene copolymer. The heterophasic propylene copolymers of the present invention may for example also contain additives, fillers or property-modifying polymers.

The ethylene-propylene rubber (EPR) is present in an amount from 12.0 wt % to 18.0 wt % of the total weight of the heterophasic propylene copolymer. Preferably, the ethylene-propylene rubber (EPR) is present in an amount from 13.0 wt % to 17.0 wt % and more preferably in an amount from 14.0 wt % to 16.0 wt % of the total weight of the heterophasic propylene copolymer. The amount of ethylene-propylene rubber is determined as the acetone insoluble fraction of the xylene soluble fraction. The acetone insoluble fraction of the xylene soluble fraction is obtained by dissolving the heterophasic propylene copolymer in refluxing xylene, cooling the solution to 25° C., filtering the solution, and subsequent agitation of the solution and acetone, which results in forming a precipitate. Said precipitate, which represents the acetone insoluble fraction of the xylene soluble fraction of the heterophasic propylene copolymer, is collected on a filter, dried and weighed.

The ethylene propylene rubber (EPR) is further characterized by an intrinsic viscosity (measured in tetralin at 135° C.) in the range from 2.0 dl/g to 4.0 dl/g. Preferably, said intrinsic viscosity is in the range from 2.25 dl/g to 3.75 dl/g, more preferably in the range from 2.5 dl/g to 3.5 dl/g.

Preferably, the heterophasic propylene copolymers of the present invention are further characterized by a propylene homopolymer (PPH) having a xylene solubles content of at most 4.0 wt %, more preferably of at most 3.5 wt % and most preferably of at most 3.0 wt %, relative to the total weight of the propylene homopolymer.

Preferably, the propylene homopolymer (PPH) of the heterophasic propylene copolymers of the present invention comprises at least two propylene homopolymer fractions of different molecular weight, i.e. different melt flow index (measured according to ISO 1133, condition L, 230° C., 2.16 kg). It is preferred that the fraction with the lowest melt flow index has a melt flow index in the range from 0.50 dg/min to 1.50 dg/min, preferably in the range from 0.75 dg/min to 1.25 dg/min.

For the purpose of the present invention the term "propylene homopolymer fraction" is used to identify a propylene homopolymer that is produced under a single average hydrogen to propylene ratio in a single polymerization reactor using a Ziegler-Natta polymerization catalyst as defined in the present application. The molecular weight of the polymer chains, and in consequence of the melt flow of the propylene polymer, is regulated by the addition of hydrogen and controlling the ratio of the feed rates of propylene and hydrogen, and consequentially by changing the hydrogen concentration in the polymerization reactor.

Preferably, the propylene homopolymer (PPH) of the heterophasic propylene copolymer of the present invention has a melt flow index (measured according to ISO 1133, condition L, 230° C., 2.16 kg) in the range from 5.0 dg/min to 8.0 dg/min. Preferably, it is in the range from 5.5 dg/min to 7.5 dg/min. Most preferably, it is in the range from 6.0 dg/min to 7.0 dg/min.

The heterophasic propylene copolymers of the present invention may also be used in a composition, preferably a composition comprising other polyolefins, such as for example propylene homopolymers, propylene random copolymers, other heterophasic propylene copolymers, which may or may not be according to the present invention, polyethylene and the likes. In such a composition it is preferred that the heterophasic propylene copolymers of the present invention comprise at least 50 wt % of the composition.

The heterophasic propylene copolymers of the present invention may contain additives such as, by way of example, antioxidants, light stabilizers, acid scavengers, lubricants, antistatic additives, nucleating/clarifying agents, colorants, flame retardants and additives to improve conductivity. An overview of such additives may be found in Plastics Additives Handbook, ed. H. Zweifel, $5^{th}$ edition, 2001, Hanser Publishers.

Preferably, the heterophasic propylene copolymers may contain one or more nucleating agents. The nucleating agent used in the present invention can be any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these. The most preferred nucleating agents are talc, carboxylate salts, and phosphate ester salts.

The carboxylate salts used as nucleating agents in the present invention can be organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1] heptane dicarboxylic acid salt. A nucleating agent of this type is sold as HYPERFORM® HPN-68 by Milliken Chemical.

Examples for sorbitol acetals are dibenzylidene sorbitol (DBS), bis(p-methyl-dibenzylidene sorbitol) (MDBS), bis (p-ethyl-dibenzylidene sorbitol) and bis(3,4-dimethyl-dibenzylidene sorbitol) (DMDBS). Bis(3,4-dimethyl-dibenzylidene sorbitol) (DMDBS) is preferred. These can for example be obtained from Milliken Chemical under the trade names of Millad 3905, Millad 3940 and Millad 3988.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula

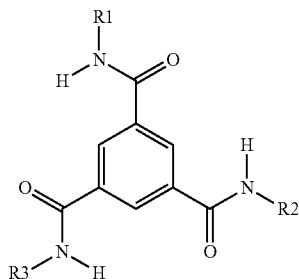

wherein R1, R2 and R3, independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, iso-pentyl, 1,1-dimethylpropyl, 1,2-dimethylpropyl, 3-methyl-butyl, hexyl, heptyl, octyl or 1,1,3,3-tetramethylbutyl. Examples for $C_5$-$C_{12}$ cycloalkyl are cyclopentyl, cyclo-hexyl, cyclooctyl, cyclododecyl, adamantyl, 2-methylcyclo-hexyl, 3-methylcyclohexyl or 2,3-dimethylcyclohexyl. Such nucleating agents are disclosed in WO 03/102069 and by Blomenhofer et al. in Macromolecules 2005, 38, 3688-3695.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the polypropylene. In physical blending the polymeric nucleating agent containing vinyl compounds is mixed with the polypropylene in an extruder or in a blender. In chemical blending the polypropylene comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cyclopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further, it is possible to use blends of nucleating agents, such as for example a blend of talc and a phosphate ester salt or a blend of talc and a polymeric nucleating agent containing vinyl compounds.

While it is clear to the skilled person that the amount of nucleating agent to be added depends upon its crystallization efficiency, for the purposes of the present invention the nucleating agent or the blend of nucleating agents is present in the polypropylene in an amount of at least 50 ppm, preferably at least 100 ppm. It is present in an amount of at most 11000 ppm, preferably of at most 5000 ppm, more preferably of at most 4000 ppm, even more preferably of at most 3000 ppm and most preferably of at most 2000 ppm.

The heterophasic propylene copolymers of the present invention are used in the production of injection-molded articles. Preferably, they are used in the production of crates, pallets, IBCs (intermediate bulk containers) and pails. Such production methods are well known to the skilled person and need not be explained in detail.

The heterophasic propylene copolymers of the present invention show good mechanical properties as evidenced by the high flexural modulus and the good impact properties. In comparison to conventional heterophasic propylene copolymers the present inventors have surprisingly succeeded in improving the overall balance of mechanical properties. The present inventors have surprisingly succeeded at modifying the conventional heterophasic propylene copolymers in such a way that the impact strength can be maintained while at the same time the stiffness is increased.

The present inventors have been utterly surprised that the heterophasic propylene copolymers of the present invention are characterized by an improved resistance to creep. The improvements are two-fold. Tests according to VDA 4500 "Kleinladungsträger (KLT)-System" on crates produced in accordance with the present invention have shown that the bottom of the crate does not show as much deformation when a 20 kg weight is placed inside as crates produced with a prior art heterophasic propylene copolymer. Even more surprisingly, upon removal of the weight the bottom almost completely returns to its original position. In other words, the heterophasic propylene copolymers of the present invention show an excellent recovery behavior after having been subjected to loading tests.

Thus, the heterophasic propylene copolymers of the present invention are particularly suited for articles that require good creep behavior. Specific articles for which the heterophasic propylene copolymers of the present invention are useful are crates, pallets, IBCs and pails.

The heterophasic propylene copolymers of the present invention are produced in presence of a Ziegler-Natta polymerization catalyst, an aluminium alkyl, an external electron donor (ED) and hydrogen. The process for the production comprises the steps of (a) polymerizing propylene to produce a propylene homopolymer (PPH),
(b) subsequently transferring the propylene homopolymer obtained in step (a) to a further polymerization reactor, and
(c) copolymerizing propylene and ethylene to produce an ethylene-propylene rubber (EPR) in said further polymerization reactor, wherein the heterophasic propylene copolymer has a melt flow index (measured according to ISO 1133, condition L, 230° C., 2.16 kg) in the range from 2.0 dg/min to 6.0 dg/min, a molecular weight distribution $M_w/M_n$ of 11.0 or more (measured on pellets) and a total ethylene content in the range from 6.0 wt % to 11.0 wt %, relative to the total weight of the heterophasic propylene copolymer, wherein the EPR has an intrinsic viscosity (measured in tetralin at 135° C.) in the range from 2.0 dl/g to 4.0 dl/g.

A Ziegler-Natta catalyst comprises a titanium compound, which has at least one titanium-halogen bond, and an internal donor, both supported on magnesium halide in active form. The internal donor is a compound selected from the group consisting of phthalates, diethers, succinates, di-ketones, enamino-imines and any blend of these. The preferred internal donor is a compound selected from the group consisting of phthalates, diethers, succinates and any blend of these. The most preferred internal donor is a compound selected from the group consisting of phthalates, diethers or blends of these.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate. Such catalysts are for example commercially available from Basell under the Avant trade name.

Suitable diethers are 1,3-diethers of formula

wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; 9,9-bis(methoxymethyl)fluorene.

Suitable succinate compounds have the formula

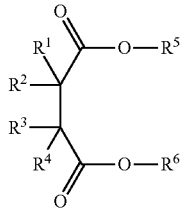

wherein $R^1$ to $R^4$ are equal to or different from one another and are hydrogen, or a $C_1$-$C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

Suitable di-ketones are 1,3-di-ketones of formula

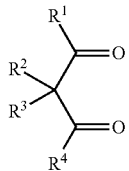

wherein $R^2$ and $R^3$ are equal to or different from one another and are hydrogen, or a C1-C20 linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable enamino-imines have the general formula

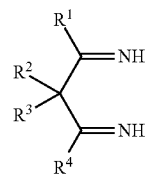

wherein $R^2$ and $R^3$ are equal to or different from one another and are hydrogen, or a C1-C20 linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

The organoaluminium compound is advantageously an Al-alkyl compound of the Al-trialkyls family, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. Al-triethyl is preferred. Advantageously, the Al-trialkyl has a hydride content, expressed as $AlH_3$, of less than 1.0 wt % with respect to the Al-trialkyl. More preferably, the hydride content is less than 0.5 wt %, and most preferably the hydride content is less than 0.1 wt %.

The organoaluminium compound is used in such an amount as to have a molar ratio Al/Ti in the range from 1 to 1000. Preferably, the upper limit is 200.

Suitable external electron donors (ED) include certain silanes, ethers, esters, amines, ketones, heterocyclic compounds and blends of these. It is preferred to use a 1,3-diether or a silane. It is most preferred to use a silane of the general formula

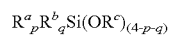

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$Si(OCH$_3$)$_2$ (referred to as "D donor").

If the external donor (ED) is present the molar ratio of organo-aluminium compound to external donor ("Al/ED") ranges advantageously between 1 and 1000. The upper limit of the Al/ED ratio preferably is at most 800, more preferably at most 600 and most preferably at most 400. The lower limit of the Al/ED molar ratio preferably is at least 5, more preferably at least 10.

Hydrogen is used to control the chain lengths of the propylene polymers. For the production of propylene polymers with higher MFI, i.e. with lower average molecular weight and shorter polymer chains, the concentration of hydrogen in the polymerization medium needs to be increased. Inversely, the hydrogen concentration in the polymerization medium has to be reduced in order to produce propylene polymers with lower MFI, i.e. with higher average molecular weight and longer polymer chains.

The polymerization of propylene is carried out according to known techniques. The polymerization can for example be carried out in liquid propylene as reaction medium. It can also be carried out in a diluent, such as an inert hydrocarbon (slurry polymerization) or in the gas phase.

The molecular weight distribution (MWD) inherently produced by a Ziegler-Natta catalyst strongly depends upon the internal electron donor. Phthalates and diethers result in propylene polymers with more narrow molecular weight distribution. On the other hand, succinates, di-ketones and enamino-imines lead to propylene polymers with broader molecular weight distribution. In consequence, when a Ziegler-Natta catalyst with a phthalate or a diether as internal electron donor is used, the broadening of the molecular weight distribution is achieved by polymerization in at least two sequential polymerization reactors in series in a bimodal configuration. Ziegler-Natta catalysts with a succinate, a di-ketone or an enamino-imine already lead to broader molecular weight distribution in monomodal configuration in a single polymerization reactor.

Thus, in a first embodiment when the internal electron donor is a phthalate or a diether, the production process for the heterophasic propylene copolymers, comprising a propylene homopolymer (PPH) and an ethylene-propylene rubber (EPR); in presence of a Ziegler-Natta polymerization catalyst, an aluminium alkyl, an external electron donor (ED) and hydrogen comprises the steps of (a) polymerizing propylene to produce at least two propylene homopolymer fractions of different melt flow indices, and combining the propylene homopolymer fractions to obtain a propylene homopolymer (PPH), (b) subsequently transferring the propylene homopolymer obtained in step (a) to a further polymerization reactor, and (c) copolymerizing propylene and ethylene to produce an ethylene-propylene rubber (EPR) in said further polymerization reactor.

It is clear to the skilled person that in this embodiment either of steps (a) and (c) can be performed in more than one polymerization reactor. Particularly step (a) can be performed in more than two polymerization reactors. Step (c) can be performed in more than one polymerization reactor.

In said first embodiment, for the production of the heterophasic propylene copolymers of the present invention it is essential that the melt flow index of the fraction with the lowest melt flow index is in the range from 0.5 dg/min to 1.5 dg/min, preferably in the range from 0.75 dg/min to 1.25 dg/min (measured according to ISO 1133, condition L, 230° C., 2.16 kg). The molecular weight of the polymer chains, and in consequence of the melt flow of the propylene polymer, is regulated by the addition of hydrogen and controlling the ratio of the feed rates of propylene and hydrogen.

In a second embodiment, when the internal electron donor is a succinate, a di-ketone or an enamino-imine, the production process for the heterophasic propylene copolymers, comprising a propylene homopolymer (PPH) and an ethylene-propylene rubber (EPR), in presence of a Ziegler-Natta polymerization catalyst, an aluminium alkyl, an external electron donor (ED) and hydrogen, comprises the steps of (a) polymerizing propylene to produce a propylene homopolymer having a broad molecular weight distribution (MWD), (b) subsequently transferring the propylene homopolymer obtained in step (a) to a further polymerization reactor, and (c) copolymerizing propylene and ethylene to produce an ethylene-propylene rubber (EPR) in said further polymerization reactor.

It is clear to the skilled person that in this embodiment either of steps (a) and (c) can be performed in more than one polymerization reactor.

Polymerization conditions, reactants' feed rates etc. are set in such a way as to result in the production of the heterophasic propylene copolymers with the properties mentioned above. This is well within the skills of the skilled person so that no further details need be given.

For the production of heterophasic propylene copolymers the polymerization is preferably carried out in one or more polymerization reactors in series, employing liquid propylene as reaction medium and then in one or more gas phase reactors in series, as is done for example in a propylene polymer production line based on Spheripol technology. It is preferred to produce a heterophasic propylene copolymer sequentially in one or more loop reactors and then in one or more gas phase reactors. It is most preferred to employ only one gas phase reactor.

In the case that the heterophasic propylene copolymer is produced in a polymer production line with three polymerization reactors, the first two reactors are used to polymerize propylene to form the polypropylene homopolymer (PPH) and the third reactor is used to copolymerize propylene and ethylene so as to produce the ethylene-propylene rubber (EPR). Preferably, the contribution of the first reactor to the total of the propylene homopolymer is in the range from 40 wt % to 60 wt %, preferably in the range from 45 wt % to 55 wt % and most preferably in the range from 45 wt % to 50 wt %.

For the present invention propylene homopolymers are preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar.

The heterophasic propylene copolymers are recovered as a powder after the last of the sequential polymerization reactors and can then be pelletized or granulated.

The heterophasic propylene copolymers may be melted in an extruder and then injected into an injection mold to form an injection-molded article, preferably a crate, pallet, IBC (intermediate bulk container) or pail.

Examples

The advantages of the heterophasic propylene copolymers of the present invention over those of the prior art are shown in the following examples.

Test Methods

Melt flow (MFI) is measured according to norm ISO 1133, condition L, 230° C., 2.16 kg.

Xylene solubles (XS), i.e. the xylene soluble fraction, are determined as follows: Between 4.5 and 5.5 g of propylene polymer are weighed into a flask and 300 ml xylene are added. The xylene is heated under stirring to reflux for 45 minutes. Stirring is continued for 15 minutes exactly without heating. The flask is then placed in a thermostat bath set to 25° C.+/−1° C. for 1 hour. The solution is filtered through Whatman n° 4 filter paper and exactly 100 ml of solvent are collected. The solvent is then evaporated and the residue dried and weighed. The percentage of xylene solubles ("XS"), i.e. the amount of the xylene soluble fraction, is then calculated according to XS (in wt %)=(Weight of the residue/Initial total weight of PP)*300 with all weights being in the same unit, such as for example in grams.

Acetone insolubles (AcIns), i.e. the acetone insoluble fraction, are determined as follow: 100 ml of the filtrate of the solution in xylene (see above) and 700 ml of acetone are agitated overnight at room temperature in a hermetically sealed flask, during which time a precipitate is formed. The precipitate is collected on a metal mesh filter with a mesh width of 0.056 mm, dried and weighed. The percentage of acetone insolubles ("AcIns"), i.e. the amount of the acetone insoluble fraction, is then calculated according to AcIns (in wt %)=(Weight of the residue/Initial weight of PP)*300 with all weights being in the same unit, such as for example in grams.

The amount of ethylene-propylene rubber in heterophasic propylene copolymer is determined as the acetone insoluble fraction of the xylene soluble fraction.

Molecular weights and molecular weight distribution are determined by Size Exclusion Chromatography (SEC) at high temperature (145° C.). A 10 mg PP sample is dissolved at 160° C. in 10 ml of trichlorobenzene (TCB, technical grade) for 1 hour. The analytical conditions for the Alliance GPCV 2000 from WATERS are:

Volume: +/−400 μl
Injector temperature: 140° C.
Column and detector: 145° C.
Column set: 2 Shodex AT-806MS and 1 Styragel HT6E
Flow rate 1 ml/min
Detector: Refractive index
Calibration: Narrow standards of polystyrene
Calculation: Based on Mark-Houwink relation (log $(M_{PP})$=log$(M_{PS})$−0.25323)

The total ethylene content (% $C_2$) is determined by NMR analysis of pellets according to the method described by G. J. Ray et al. in Macromolecules, vol. 10, n° 4, 1977, p. 773-778.

The intrinsic viscosity of the propylene homopolymer (PPH) is determined on a collected sample of PPH produced at the end of the homopolymerization process. The intrinsic viscosity is determined in a capillary viscometer in tetralin at 135° C.

The intrinsic viscosity of the ethylene-propylene rubber (EPR) is determined using the acetone insoluble fraction of the xylene soluble fraction of the heterophasic propylene copolymer. The intrinsic viscosity is determined in a capillary viscometer in tetralin at 135° C.

Flexural modulus was measured according to ISO 178 at 23° C.

Notched Izod impact strength was measured according to ISO 180 at the temperature indicated in the tables below.

Heterophasic Propylene Copolymers

The heterophasic propylene copolymers used in the examples were produced on an industrial propylene polymerization plant having two loop reactors and a gas phase reactor (GPR) in series. As catalyst, a Ziegler-Natta catalyst with a phthalate as internal donor, was used. External donor was (cyclopentyl)$_2$ Si(OCH$_3$)$_2$ (referred to as "D donor").

Further polymerization conditions are given in table 1. Properties of the propylene homopolymer (PPH) and the ethylene-propylene rubber (EPR) are given in table 2.

After recovery from the gas phase reactor the heterophasic propylene copolymers were additivated with an antiacid, an antistatic agent, a nucleating agent and a sufficient amount of antioxidants. Properties of the heterophasic propylene copolymers are given in table 3.

TABLE 1

|  | Unit | Example 1 | Comp. ex. 1 |
|---|---|---|---|
| Catalyst |  | Phthalate | Phthalate |
| External Donor (ED) |  | D | D |
| Catalyst Activation |  |  |  |
| TEAL/Propylene | g/kg | 0.14 | 0.14 |
| TEAL/ED | g/g | 5 | 5 |
| Loop 1-PPH |  |  |  |
| Hydrogen | vpm | 450 | 1950 |
| Contribution Loop1 | % | 48 | 62 |
| MFI | dg/min | 1.0 | 6.0-7.0 |
| Loop 2-PPH |  |  |  |
| Hydrogen | vpm | 15000 | 1950 |
| MFI ratio = MFI$_{Loop\ 2}$ / MFI$_{Loop\ 1}$ |  | 35 | 1 |
| GPR-EPR |  |  |  |
| H$_2$/C$_2$ (in vol %) |  | 0.05 | 0.05 |
| C$_2$/C$_2$ + C$_3$ (in vol %) |  | 0.42 | 0.42 |

TABLE 2

|  | Unit | Example 1 | Comp. ex. 1 |
|---|---|---|---|
| PPH |  |  |  |
| MFI | dg/min | 6.0-7.0 | 6.0-7.0 |
| Xylene solubles | wt % | 2.1 | 2.2 |
| η$_{PPH}$ | dl/g | 1.8 | 1.8 |
| EPR |  |  |  |
| η$_{EPR}$ | dl/g | 3.0 | 3.0 |

TABLE 3

|  | Unit | Example 1 | Comp. ex. 1 |
|---|---|---|---|
| MFI | dg/min | 3.0 | 3.5 |
| C$_2$ content | wt % | 8.9 | 8.3-9.3 |
| Acetone Insoluble content | wt % | 15.2 | 14.9 |
| Xylene Solubles PPH | wt % | 2.1 | 2.2 |
| SEC (pellets) |  |  |  |
| M$_n$ | kDa | 35 | 42 |
| M$_w$ | kDa | 450 | 360 |
| M$_z$ | kDa | 2750 | 1600 |
| M$_w$/M$_n$ |  | 12.8 | 8.5 |
| Flexural modulus | MPa | 1470 | 1400 |
| Izod, notched @ 23° C. | kJ/m$^2$ | 16 | 16 |

The results show that the present inventors have succeeded in increasing the flexural modulus of the heterophasic propylene copolymer while at the same time keeping the original impact strength. Therefore, the heterophasic propylene copolymer of the present invention allows for downgauging without any loss in the properties of the finished article.

Creep Behavior

The heterophasic propylene copolymers of example 1 and comparative example 1 were used to injection mold VDA RL-KLT crates having a weight of 1.82 kg and nominal dimensions of 594 mm by 396 mm.

A crate of each heterophasic propylene copolymer was subjected to a creep test in accordance with VDA 4500 "KLT-System". The tests were performed by loading the crates with a weight of 20 kg and taking the measurements of the deformation of the bottom before loading, 24 hours and 96 hours after loading, and again directly and 96 hours after removal of the weight.

Results for the deformation of the bottom, given in mm relative to the zero line; are reported in table 4.

TABLE 4

|  | Unit | Example 1 | Comp. ex. 1 |
|---|---|---|---|
| Before loading | mm | 2.5 | 2.5 |
| After loading |  |  |  |
| Immediately | mm | −6.0 | −6.5 |
| 24 h | mm | −9.0 | −9.5 |
| 96 h | mm | −9.5 | −10.5 |
| After removal of load |  |  |  |
| Immediately | mm | −4.5 | −5.5 |
| 48 h | mm | 1.0 | −1.0 |

The results of the creep tests show that the crate produced with the heterophasic propylene copolymer according to the present invention has improved creep behavior in crates. Compared to the prior art heterophasic propylene copolymer the crate showed reduced deformation of the bottom, surprisingly the difference between the heterophasic propylene copolymers of the prior art and the present invention became more pronounced the longer the test proceeded. Even more surprisingly the heterophasic propylene copolymer of the present invention showed much higher recovery than the prior art heterophasic propylene copolymer. Thus, the heterophasic propylene copolymers of the present invention are particularly well suited for articles which require improved creep behavior.

The invention claimed is:

1. A heterophasic propylene copolymer comprising:
   (i) a propylene homopolymer (PPH); and
   (ii) from 12.0 wt % to 18.0 wt % of an ethylene propylene rubber (EPR), wherein the heterophasic propylene copolymer exhibits a melt flow index in the range from 2.0 dg/min to 6.0 dg/min (measured according to ISO 1133, condition L, 230° C. 2.16 kg), a molecular weight distribution $M_w/M_n$ of 11.0 or more (as measured on pellets) and a total ethylene content in the range from 6.0 wt % to 11.0 wt % relative to the total weight of the heterophasic propylene copolymer, wherein the EPR has an intrinsic viscosity (measured in tetralin at 135° C.) in the range from 2.0 dl/g to 4.0 dl/g;
   wherein an injection molded VDA RL-KLT crate of the heterophasic propylene copolymer exhibits greater resistance to creep, as determined by a creep test in accordance with VDA 4500 KLT-System, in comparison to an injection molded VDA RL-KLT crate of a comparative heterophasic propylene copolymer having a molecular weight distribution $M_w/M_n$ of 8.5.

2. The heterophasic propylene copolymer of claim 1, wherein the EPR, determined as the acetone insoluble fraction of the xylene soluble fraction, is present in an amount from 13.0 wt % to 17.0 wt % of the total weight of the heterophasic propylene copolymer.

3. The heterophasic propylene copolymer of claim 1, wherein the PPH comprises at least two propylene homopolymer fractions of different melt flow index (measured according to ISO 1133, condition L, 230° C., 2.16 kg) and wherein the fraction with the lowest melt flow index has a melt flow index in the range from 0.50 dg/min to 1.50 dg/min.

4. The heterophasic propylene copolymer of claim 3, wherein the PPH has a melt flow index in the range from 5.0 dg/min to 8.0 dg/min.

5. The heterophasic propylene copolymer of claim 3, wherein the fraction with the lowest melt flow index has a melt flow index in the range from 0.75 dg/min to 1.25 dg/min.

6. The heterophasic propylene copolymer of claim 1, wherein the PPH and the EPR, together, comprise at least 95.0 wt % of the heterophasic propylene copolymer.

7. The heterophasic propylene copolymer of claim 1, further comprising a nucleating agent.

8. An article comprising the heterophasic propylene copolymer of claim 1.

9. The article of claim 8, wherein the article is a crate, a pallet, an IBC or a pail.

10. The article of claim 8 manufactured by injection molding.

11. The heterophasic propylene copolymer of claim 1, wherein the heterophasic propylene copolymer is polymerized in the presence of a catalyst comprising an internal donor, wherein the internal donor is either:
   selected from a group consisting of phthalates, diethers, and combinations thereof; or
   selected from a group consisting of succinates, di-ketones, enamino-imines, and combinations thereof.

12. The heterophasic propylene copolymer of claim 1, wherein the total ethylene content is at most 9.5 wt %.

13. The heterophasic propylene copolymer of claim 1, wherein the heterophasic propylene copolymer exhibits a molecular weight distribution $M_w/M_n$ of 11.5 or more (as measured on pellets).

14. The heterophasic propylene copolymer of claim 1, wherein the heterophasic propylene copolymer exhibits a molecular weight distribution $M_w/M_n$ of 12.0 or more (as measured on pellets).

15. The heterophasic propylene copolymer of claim 1, wherein the EPR has an intrinsic viscosity (measured in tetralin at 135° C.) in the range from 2.5 dl/g to 3.5 dl/g.

16. The heterophasic propylene copolymer of claim 1, wherein the PPH has a melt flow index in the range from 6.0 dg/min to 7.0 dg/min.

17. The heterophasic propylene copolymer of claim 1, wherein the PPH and the EPR, together, comprise at least 95 wt % of the heterophasic propylene copolymer, and wherein the heterophasic propylene copolymer is adapted for injection molding.

18. The heterophasic propylene copolymer of claim 1, wherein the PPH has a xylene solubles content of at most 3.0 wt. % relative to a total weight of the PPH.

19. The heterophasic propylene copolymer of claim 1, wherein the PPH and the EPR, together, comprise at least 97 wt % of the heterophasic propylene copolymer, and wherein the heterophasic propylene copolymer is adapted for injection molding.

20. The heterophasic propylene copolymer of claim 1, wherein the EPR, determined as the acetone insoluble fraction of the xylene soluble fraction, is present in an amount from 14.0 wt % to 16.0 wt % of the total weight of the heterophasic propylene copolymer.

21. A process for the production of a heterophasic propylene copolymer comprising a propylene homopolymer (PPH), and from 12.0 wt % to 18.0 wt % of an ethylene propylene rubber (EPR) in presence of a Ziegler-Natta polymerization catalyst, an aluminium alkyl, an external electron donor and hydrogen, said process comprising:

(a) polymerizing propylene to produce the PPH;
(b) subsequently transferring the PPH obtained in step (a) to a further polymerization reactor;
(c) copolymerizing propylene and ethylene to produce the EPR in said further polymerization reactor, wherein the heterophasic propylene copolymer has a melt flow index (measured according to ISO 1133, condition L, 230° C., 2.16 kg) in the range from 2.0 dg/min to 6.0 dg/min, a molecular weight distribution $M_w/M_n$ of 11.0 or more (measured on pellets) and a total ethylene content in the range from 6.0 wt % to 11.0 wt %, relative to the total weight of the heterophasic propylene copolymer, wherein the EPR has an intrinsic viscosity (measured in tetralin at 135° C.) in the range from 2.0 dl/g to 4.0 dl/g;
wherein an injection molded VDA RL-KLT crate of the heterophasic propylene copolymer exhibits greater resistance to creep, as determined by a creep test in accordance with VDA 4500 KLT-System, in comparison to an injection molded VDA RL-KLT crate of a comparative heterophasic propylene copolymer having a molecular weight distribution $M_w/M_n$ of 8.5.

22. The process of claim 21, wherein the Ziegler-Natta polymerization catalyst comprises an internal donor selected from the group consisting of phthalates, diethers and combinations thereof.

23. The process of claim 21, wherein the PPH comprises at least two propylene homopolymer fractions of different melt flow index (measured according to ISO 1133, condition L, 230° C., 2.16 kg), and wherein the process further comprises regulating the melt flow index of the fraction with the lowest melt flow index to be in the range from 0.50 dg/min to 1.50 dg/min.

24. The process of claim 23, wherein the fraction with the lowest melt flow index has a melt flow index in the range from 0.75 dg/min to 1.25 dg/min.

25. The process of claim 21, wherein the EPR has an intrinsic viscosity (measured in tetralin at 135° C.) in the range from 2.5 dl/g to 3.5 dl/g.

* * * * *